(12) United States Patent
Johnson

(10) Patent No.: US 8,122,646 B1
(45) Date of Patent: Feb. 28, 2012

(54) METHOD AND APPARATUS FOR AN INFLATABLE SHELL

(75) Inventor: Christopher J. Johnson, Houston, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 329 days.

(21) Appl. No.: 12/402,986

(22) Filed: Mar. 12, 2009

(51) Int. Cl.
E04H 15/20 (2006.01)

(52) U.S. Cl. ......... 52/2.22; 52/2.24; 52/108; 244/158.3; 244/159.2

(58) Field of Classification Search .................... 52/2.11, 52/2.22, 2.23, 108, 2.24, 2.26; 244/158.3, 244/159.2
See application file for complete search history.

(56) References Cited

U.S. PATENT DOCUMENTS

| | | | |
|---|---|---|---|
| 2,362,488 A | 11/1944 | Jahn | |
| 3,589,653 A | 6/1971 | Slater | |
| 4,087,063 A | 5/1978 | Caffey | |
| 5,205,517 A | 4/1993 | Reuter | |
| 5,296,044 A | 3/1994 | Harvey et al. | |
| 6,231,010 B1 * | 5/2001 | Schneider et al. | 244/158.3 |
| 6,311,709 B1 | 11/2001 | Louie et al. | |
| 6,547,189 B1 | 4/2003 | Raboin et al. | |
| 6,689,952 B2 | 2/2004 | Kawaguchi | |
| 2004/0245402 A1 | 12/2004 | Dasagulier et al. | |

* cited by examiner

*Primary Examiner* — William Gilbert
(74) *Attorney, Agent, or Firm* — Kurt G. Hammerle

(57) ABSTRACT

A method of assembling an inflatable shell of a structure comprises folding a plurality of shell sections about a set of fold lines and integrating the plurality of shell sections together with one another to form the shell. In another embodiment, an inflatable shell comprises a plurality of shell sections, each shell section having two pairs of fold lines for folding into stowage comprising a first gore section having a plurality of first gore panels layered and collectively folded about at a first set of fold lines. Each layer of the first gore panels and second gore panels are configured such that, once the first gore panel and second gore panel are attached to one another at the respective side edges of each panel, the lines of attachment forming a second set of fold lines for the shell section. A system and method for fabricating gore panels is also disclosed.

3 Claims, 18 Drawing Sheets

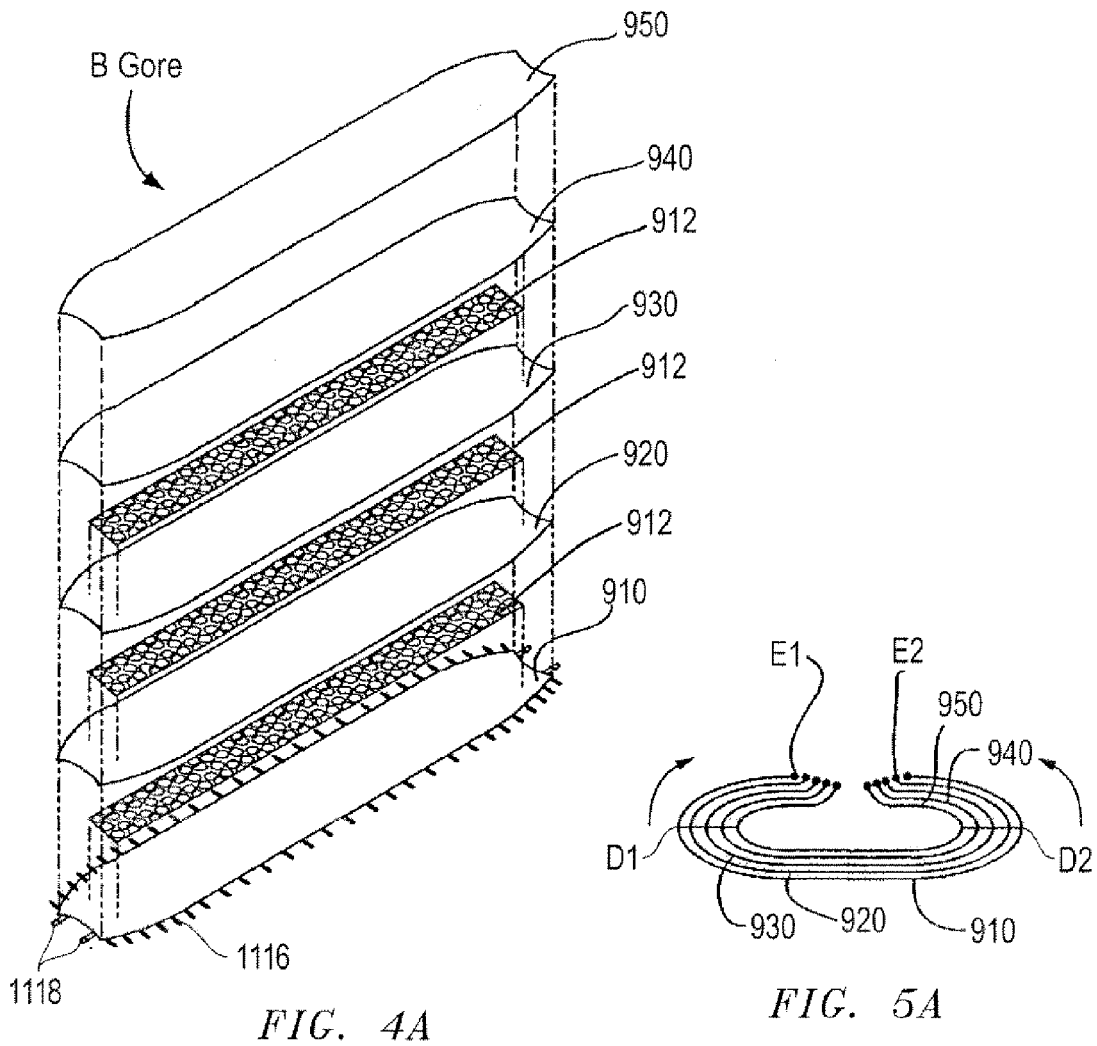
FIG. 4A
FIG. 5A
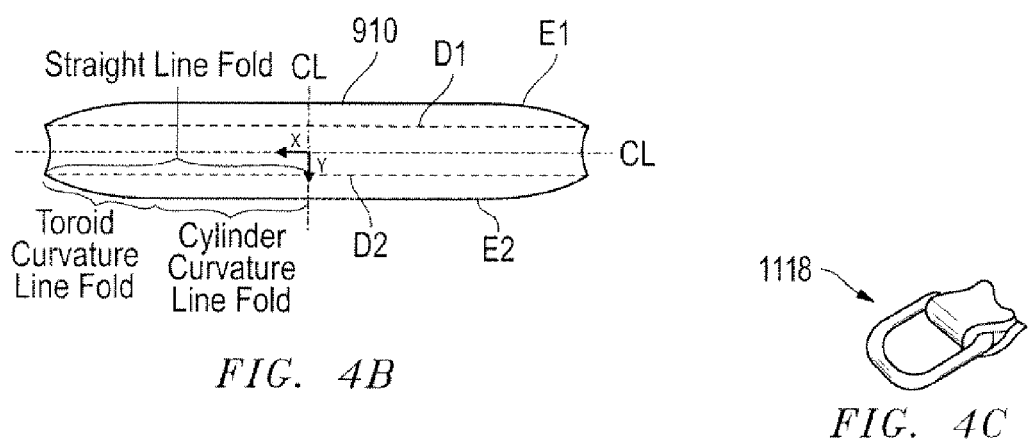
FIG. 4B
FIG. 4C

| | | MMOD INNER LEVEL 1 | MMOD LEVEL 2 | MMOD LEVEL 3 |
|---|---|---|---|---|
| Total # of LEVELS | 4 | | | |
| Stowed Restraint Diameter | Ds | 61.146 | 61.146 | 61.146 |
| Deployed Restraint Diameter | Dd | 133 | 138.25 | 143.5 |
| Core Height | Hc | 103.09 | 108.34 | 113.59 |
| Total Gore Number | Ng | 14 | 14 | 14 |
| Restraint Clevis Angle | Beta | 90 | 90 | 90 |
| Level Material Thickness | T.i | 0.045 | 0.048 | 0.108 |
| Stowed Spacing on exterior of LEVEL | Ss.i | 0.25 | 0.25 | 0 |
| Deployed Spacing on exterior of LEVEL | Sd.i | 2.625 | 2.625 | 0.12 |
| Fold width (B/A) Ratio | Ratio.i | 3.5 | 3.3 | 3 |
| Toroid Radius | Rt | 35.93 | 38.55 | 41.18 |
| Toroid Arc Length | TorLeng | 56.43 | 60.56 | 64.68 |
| Cylinder Height | Hgc | 31.24 | 31.24 | 31.24 |
| Gore Length | Lg | 144.104 | 152.351 | 160.597 |
| Straight Fold Hinge Width | Sw.i | 3.365 | 3.081 | 2.602 |
| Necessary Straight Fold Hinge Width | Swn.i | 1.292 | 0.946 | 0.480 |
| Curvature Fold Hinge Width | Cw.i | 0.000 | 1.462 | 3.118 |
| Necessary Curvature Fold Hinge Width | Cwn.i | 0.000 | 0.340 | 0.686 |
| A-B to A-B Folded offset | Fo | 2.610 | 1.899 | 1.089 |

LEVEL 1

Gore "A" Toroid equations
x = 15.618000 + 56.434000 *T
y = 3.049140 + 0.000000 + 8.062000 *cos( 90.000000 *T)
z = 0.000000

Gore "B" Toroid equations
x = 15.618000 + 56.434000 *T
y = 10.671990 + 0.000000 + 8.062000 *cos( 90.000000 *T)
z = 0.000000

| T | GORE A X | GORE A +/-Y | GORE B X | GORE B +/-Y |
|---|---|---|---|---|
| 0 | 15.62 | 11.11 | 15.62 | 18.73 |
| 0.1 | 21.26 | 11.01 | 21.26 | 18.63 |
| 0.2 | 26.90 | 10.72 | 26.90 | 18.34 |
| 0.3 | 32.55 | 10.23 | 32.55 | 17.86 |
| 0.4 | 38.19 | 9.57 | 38.19 | 17.19 |
| 0.5 | 43.83 | 8.75 | 43.83 | 16.37 |
| 0.6 | 49.48 | 7.79 | 49.48 | 15.41 |
| 0.7 | 55.12 | 6.71 | 55.12 | 14.33 |
| 0.8 | 60.77 | 5.54 | 60.77 | 13.16 |
| 0.9 | 66.41 | 4.31 | 66.41 | 11.93 |
| 1 | 72.05 | 3.05 | 72.05 | 10.67 |

METHOD AND APPARATUS FOR AN INFLATABLE SHELL

ORIGIN OF THE INVENTION

The invention described herein was made by an employee of the United States Government and may be manufactured and used by or for governmental purposes without the payment of any royalties thereon or therefor.

FIELD OF THE INVENTION

The present invention relates to an inflatable shell system and methods of manufacturing and assembling an inflatable module or vessel in a folded, collapsed state.

BACKGROUND OF THE INVENTION

Inflatable hybrid spacecraft modules or vessels (hereinafter, "inflatable vessels") are commonly lightweight, flexible, collapsible, and compact structures before launch into space. In the uninflated configuration, the size and profile of the inflatable vessel are significantly reduced, and the vessel will encompass less volume within the space vehicle in preparation for launch. A smaller vessel is also more easily handled before launch such as, for example, during stowage. Once inflated and enlarged, inflatable structures provide adequate volume for human habitation, laboratory work, and/or space flight. U.S. Pat. Nos. 6,231,010 and 6,547,189 describe in more detail some exemplary embodiments of such structures.

The primary components of an inflatable vessel in accordance with one embodiment comprises a structural core and an inflatable shell comprising multiple layers of material disposed about the core that are capable of expanding radially outward upon inflation. For efficient deployment, the inflatable vessel is preferably maintained in an uninflated configuration before use.

Maintaining the inflatable vessel in a suitable uninflated configuration during stowage before launch and during launch and flight before deployment has generally required the acts of inflating the inflatable vessel and assembling the outer layers of the inflatable shell about the structural core while the inflatable vessel is disposed in the inflated configuration. The layers of the inflatable shell are then folded about the structural core and secured in this configuration. This folding operation requires a substantial amount of labor and equipment.

SUMMARY OF THE INVENTION

In one aspect, a method of assembling an inflatable shell of an inflatable vessel comprises providing a core. A plurality of shell sections of the inflatable shell are assembled including manipulating each shell section into a folded configuration. The plurality of assembled shell sections are integrated about the core, including attaching each assembled shell section to adjacent assembled shell sections and assembling a folded inflatable shell about the core.

In another aspect, an inflatable shell comprises a plurality of shell sections, where each of the shell sections comprises a first gore section having a plurality of layers collectively folded about at least a first set of first fold lines. A second gore section has a plurality of layers, the second gore section being attached to the first gore section.

In another embodiment, a system and method of manufacturing a shell section for an inflatable shell comprises storing a defined set of equations in a memory of a controller. A set of geometric data representative of the inflatable shell is input to the equations. A set of dimensions is calculated defining each gore panel of a shell section, and a set of fold lines is calculated for each shell section. The system manufactures the shell section in accordance with the calculated set of dimensions and set of fold lines.

Other aspects and advantages of the embodiments described herein will become apparent from the following detailed description and appended claims, taken in conjunction with the accompanying drawings, illustrating the principles of the embodiments by way of example only.

BRIEF DESCRIPTION OF THE DRAWINGS

For a detailed understanding of embodiments of the present invention, references are made to the following detailed description of exemplary embodiments, taken in conjunction with the accompanying drawings, in which like elements have been given like numerals, wherein:

FIG. 4A is an exploded view of one embodiment of a multi-layer "B" gore section before folding;

FIG. 4B is a view showing the straight line and curved line fold areas of a gore section;

FIG. 4C shows a detail of an embodiment for an attachment device;

FIG. 5A is a cross-sectional view of a folded "B" gore section;

FIG. 12 is a table showing a portion of the input and output of the method for calculating the dimensions of a gore section;

FIG. 13 is a table showing output data for sizing a layer of a gore section;

DETAILED DESCRIPTION OF EXEMPLARY EMBODIMENTS

Figure 1A:
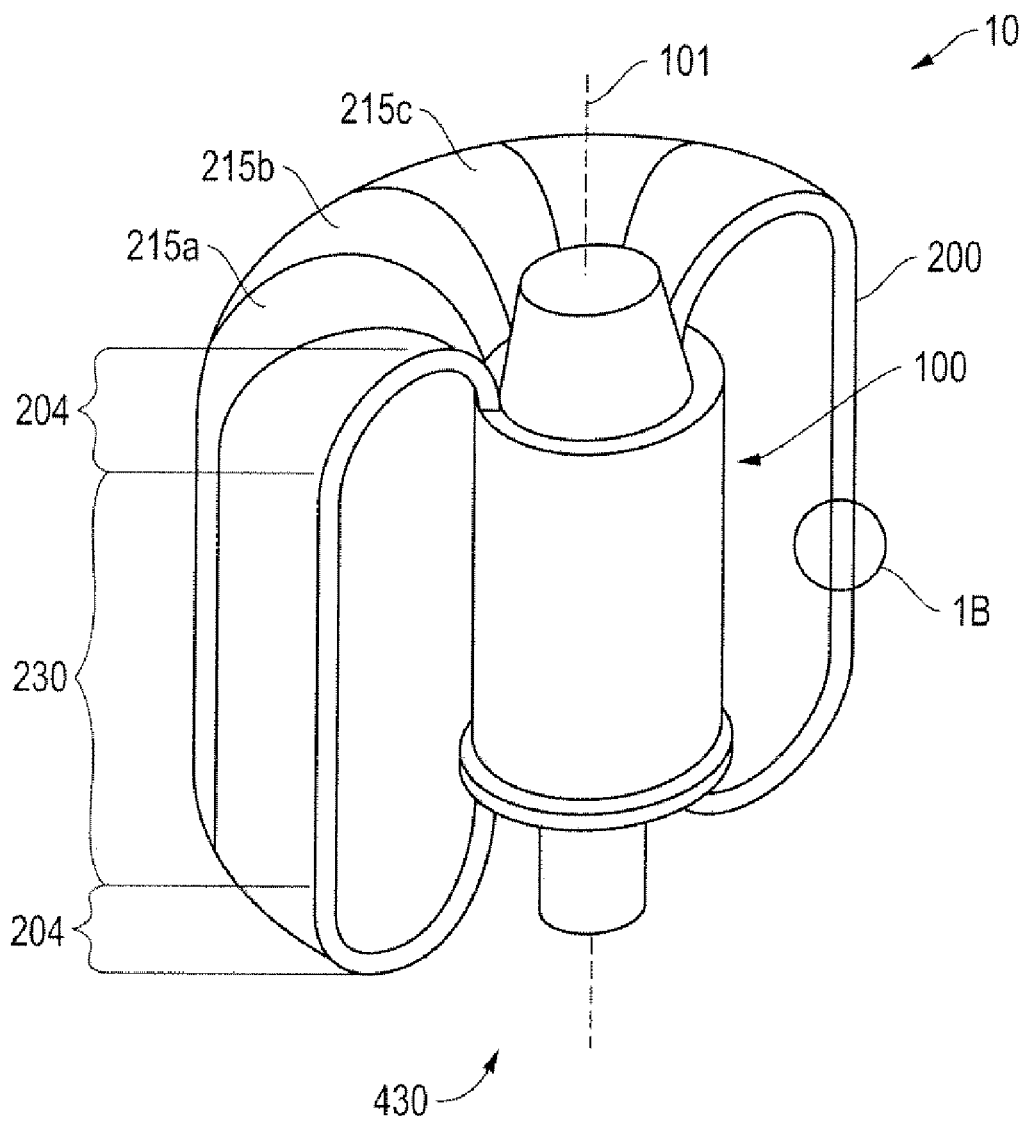
FIG. 1A is a partial isometric view of an illustrative example of an inflatable vessel in the deployed or inflated configuration.

Exemplary embodiments will now be described with reference to the accompanying drawings or figures. Throughout the drawings, like elements or components are denoted with the same reference characters for consistency Referring now to FIGS. 1A and 1B, in one exemplary embodiment an inflatable vessel 10 comprises a structural core 100 having a longitudinal axis 101 and a multi-layered inflatable shell 200 disposed about the core 100. The exemplary embodiments described herein concern the design, manufacture, and installation and assembly of one or more layers of the inflatable shell 200. A partial cross-sectional view of the inflatable shell 200 of FIG. 1B shows an example of a multi-layered construction of the shell. In this example, the inflatable shell 200 comprises a restraint sub-assembly 201 and an environmental shield sub-assembly 202. Various aspects of the exemplary embodiments described herein are equally applicable to construction of all components of the inflatable shell and to portions of the inflatable shell. For example, one or more layers of the inflatable shell may be assembled together in accordance with the exemplary embodiments for only one sub-assembly of the inflatable shell, such as the restraint sub-assembly 201 or the environmental shield sub-assembly 202.

In the embodiment of FIG. 1B, restraint sub-assembly 201 comprises a substantially gas impermeable bladder 205, and a restraint layer 210. Bladder 205 may be made of any suitable flexible material including, but not limited to, polyethylene and biaxially-oriented polyethylene terephthalate (boPET) material. In at least one embodiment, bladder 205 comprises a single-piece or unitary construction of material to facilitate the requirement of substantial gas impermeability and to provide a means for containing a fluid that inflates the shell 200 without undue leakage. Restraint layer 210 may be made of any material having sufficient strength for restraining the expansion of bladder 205 to a particular size and shape of interest. Examples of such materials include woven fabrics of aramid fiber, glass fiber, carbon fiber, or any other suitable material.

In at least one embodiment, the environmental shield sub-assembly 202 comprises a plurality of "shell sections". Each "shell section" in turn comprises a plurality of "gore sections", such as a gore section "A" and a gore section "B". Typically each "gore section" comprises multiple layers of material, each layer comprising a "gore panel" to form a particular gore section. The material comprising each panel will be described in more detail later with reference to FIG. 4A. One skilled in the art will appreciate that the layers or panels exterior to the bladder 205 that are combined to form sub-assembly 202 are not ordinarily leak-proof or "substantially gas impermeable" as would be the bladder.

The inflatable vessel 10 has two basic configurations: a launch or stowed configuration (described in detail later) and a deployed or inflated configuration (as partially shown in FIG. 1A). In the launch or stowed configuration, the thickness of the inflatable shell 200 may be collapsed by vacuum, or the like, and the inflatable shell 200 deflated, collapsed, and folded around the structural core 100. Both the deflated inflatable shell 200 and the structural core 100 may be stored within the payload bay of an appropriate launch vehicle, such as the Space Shuttle.

During deployment the inflatable shell 200 is inflated to its full volume and surrounds the structural core 100. In the deployed (also called inflated) configuration 430, the inflatable shell unfolds and takes a desired shape and geometry. In the exemplary embodiment of the inflatable shell 200 shown in FIGS. 1A and 1B, inflated configuration 430 has a generally cylindrical region 230 that is centrally located and a toroidal region 204 extending on opposite ends of the cylindrical region. In one example, in the deployed configuration 430, as shown in FIG. 1A, the interior volume of the inflatable vessel 10 may be substantially larger than that of the entire Space Shuttle payload bay. As seen in FIG. 1A, at least a portion of the inflatable shell 200 is assembled in a plurality of shell sections denoted as 215a, 215b and 215c. Sections 215a-c comprise a plurality of gore panels connected together to form gore sections or gores.

Figure 1B:
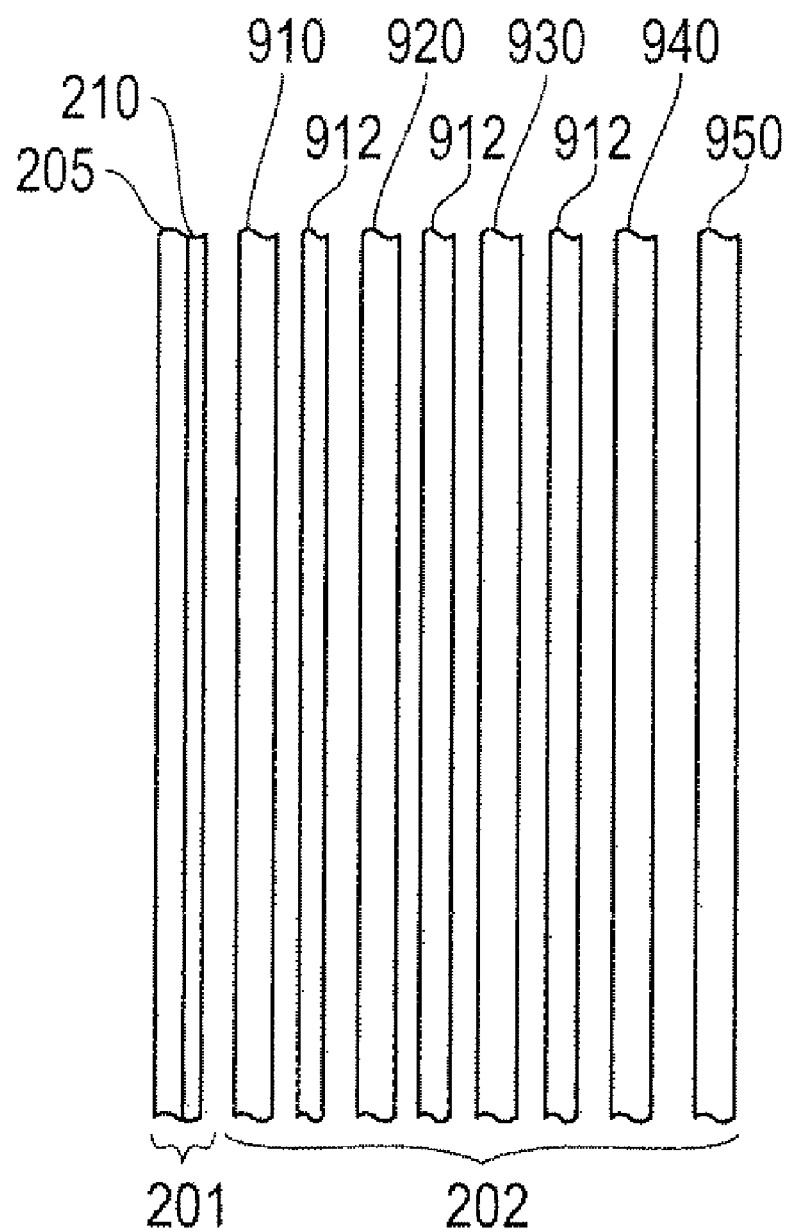
FIG. 1B is an exploded, cross-sectional view showing one example of a multi-layer construction of a shell of an inflatable vessel of FIG. 1A.

While the drawings appended hereto seemingly represent the structural core 100 as a rigid structure, the embodiments described herein may not require a structural core such as that shown in FIG. 1A. Rather, the "structural core" may be any supporting structure about which an inflatable shell may be disposed. Thus, the structural core 100 may comprise an inflatable or expandable structure.

The inflatable vessel 10 commonly provides a large volume when deployed, but is relatively compact before deployment. The vessel 10 may be useful for many purposes and may be particularly suited for a long duration space flight. Possible uses for the vessel 10 include, but are not limited to, a habitation element of an interplanetary vehicle that transports humans between planetary destinations, a habitation or laboratory module on the International Space Station and the like, and a laboratory or habitation module pre-deployed to a surface of a planet, the moon or other celestial body.

While the exemplary embodiments described herein concern space vessels, it should be understood that various aspects of the exemplary systems and methods are contemplated to be suitable for and equally applicable to the design, assembly, installation, manufacture and/or structure of other flexible, inflatable structural vessels. Elements of the design, assembly, installation, and manufacturing techniques described herein may be applied, for example, to such vessels as inflatable hyperbaric chambers, inflatable airlocks, offshore platform ballasts, and the like. The detailed description provided herein, which pertains to an inflatable vessel serving as a habitation or laboratory module for space flight, is exemplary and should not be construed to limit the scope of the appending claims.

Figure 2A:
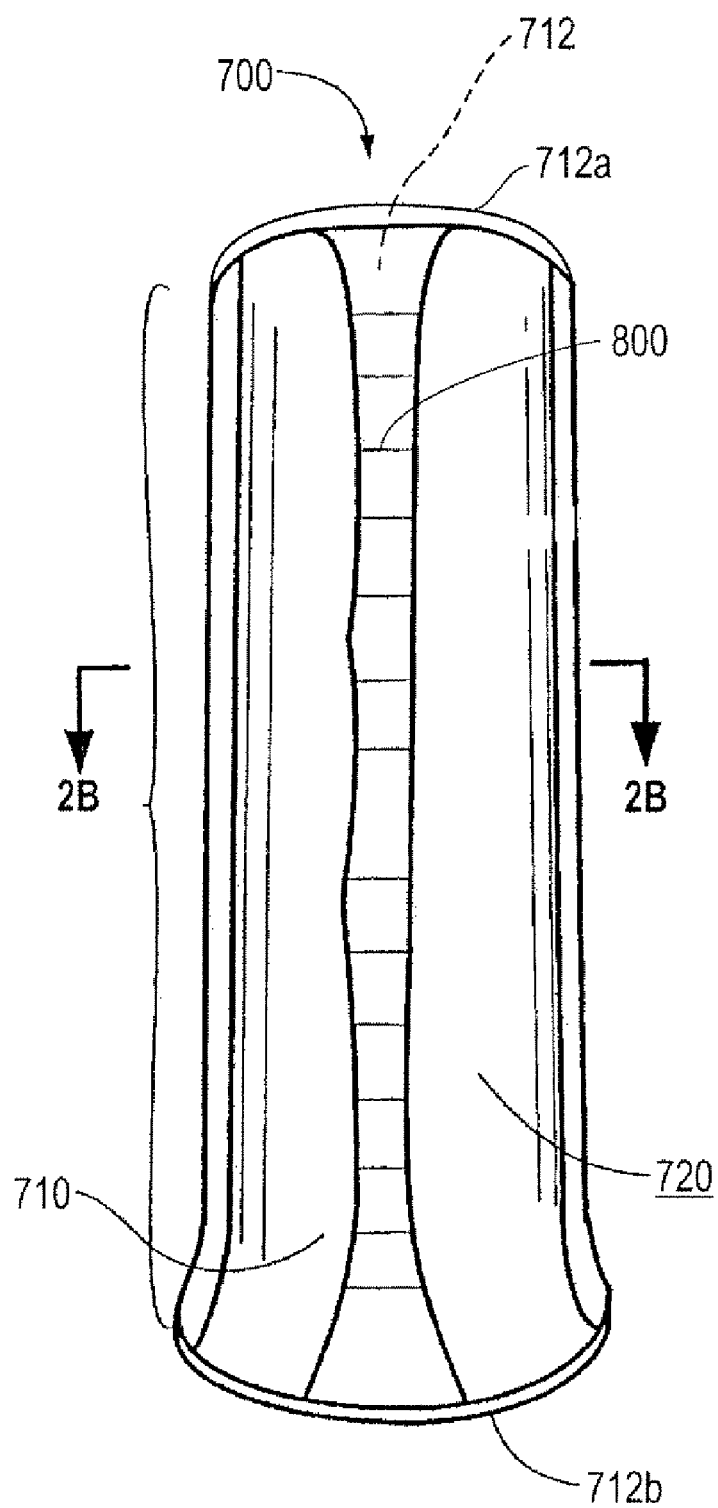
FIG. 2A is a simplified perspective view of one example of an inflatable vessel in a stowed configuration including folded layers of an inflatable shell.

FIG. 2A is a view of an example of an inflatable vessel 700 disposed in a folded, uninflated configuration. The inflatable vessel 700 includes an inflatable shell 710 and a structural core 712 beneath the inflatable shell 710. The structural core 712 provides a base support for the inflatable shell 710 disposed about the structural core 712.

Figure 2B:
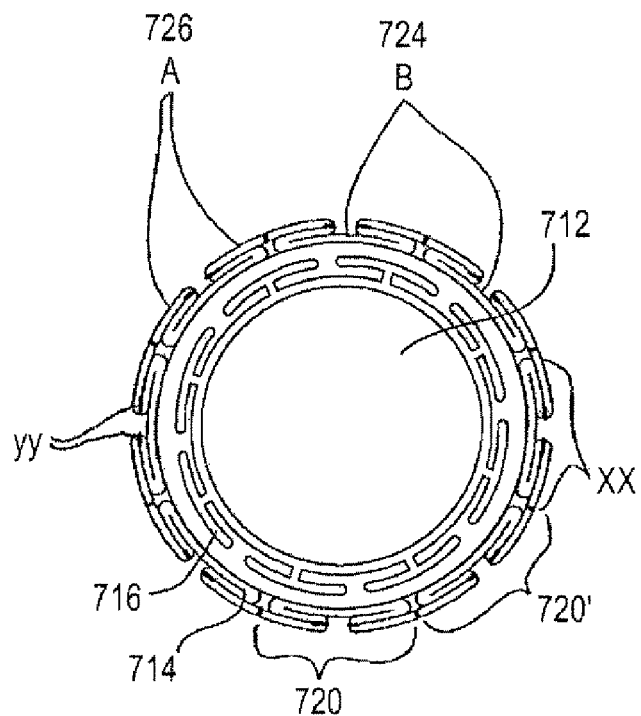
FIG. 2B is a cross-sectional view along line 2B-2B of FIG. 2A.

As shown in FIG. 2B, the inflatable shell 710 comprises a restraint sub-assembly 716, and an environmental shield sub-assembly 714, similar to the restraint sub-assembly 201 and the environmental shield sub-assembly 202, respectively, described previously with respect to FIG. 1B. FIG. 2B is a cross sectional view of FIG. 2A showing the restraint sub assembly 716 folded about the circumference of structural core 712 and located between the core 712 and the environmental shield sub-assembly 714. The environmental shield sub-assembly 714 is also shown as being folded. Both sub-assemblies 716 and 714 shown in FIG. 2B may comprise a plurality of gore panels designed, manufactured, and folded using the inventive methods described herein.

In one embodiment, the restraint sub-assembly 716 may be placed over the core 712 and then inflated while disposed about the core 712. After deflation of the restraint sub-assembly 716, it may then be folded about the core 712 and disposed in a stowed and deployable configuration.

With the restraint sub-assembly 716 folded in place, the environmental shield sub-assembly 714 can be installed about and integrated together with the rest of the vessel 700, as discussed in more detail below. During deployment, the restraint sub-assembly 716 may be inflated and expanded radially outward. As the bladder expands, it pushes out the layers that are disposed adjacent and radially outward of the restraint sub-assembly 716, namely the environmental shield sub-assembly 714. The folded environmental shield sub-assembly 714 responds to the radially outward pressure of the inflating restraint sub-assembly 716 by also expanding. With respect to the exemplary embodiments, the environmental shield 714 unfolds typically along pre-defined fold lines, and takes the three-dimensional shape or geometry intended of the inflatable shell 710 similar to that of shell 200 of FIG. 1A. When inflated, vessel 700 assumes a shape similar to vessel 10 of FIG. 1A having a central cylindrical section and toroid sections at both ends.

The inflatable vessel 700 of FIG. 2A is depicted in a fully assembled but uninflated configuration, with the entire inflatable shell 710 being disposed about the structural core 712. The environmental shield sub-assembly 714 of the inflatable shell 710 is similarly shown in the folded and uninflated configuration. The folded inflatable shell 710 may extend generally between a top bulkhead or ring 712a of the structural core 712 and a bottom bulkhead or base 712b of the structural core 712. Inflatable shell 710 may be described as having multiple vertical shell sections 720 that extend vertically, from near the base 712b to near the top ring 712a. The shell sections 720 may be secured to adjacent shell sections with a deployment system 800 that may comprise one or more cord elements. When all of the shell sections 720 are secured by deployment system 800, they are secured around the core. One embodiment of the present invention provides an assembly method and structural design of the inflatable shell that accommodates the shape of both the cylindrical and toroid regions of the inflated vessel. The assembly method and structural design must accommodate these regions during assembly, while the shell is disposed in the uninflated configuration, during inflation and unfolding of the inner and outer layers, and finally, while the shell is in the inflated configuration. With respect to the double curvature region of the torpid section, the sections of the shell 710 that "correspond" to these regions must be efficiently folded and stowed, but readily unfold to accurately take the desired double curvature shape upon inflation.

A closer inspection of the multi-layer, folded and deflated inflatable shell 710, as provided in the cross-sectional view of FIG. 2B, shows that the folded inflatable shell 710 comprises alternating "A" gore sections 726 and "B" gore sections 724. The B gore sections 724 are disposed radially inward of, and tucked underneath, a pair of outside or wing A gore sections 726. The B gore sections are partially covered by the A gore sections. The folding correspondence between the two gore sections provides for the "A" gore sections 726 to overlap the "B" gore sections 724.

Figure 3:
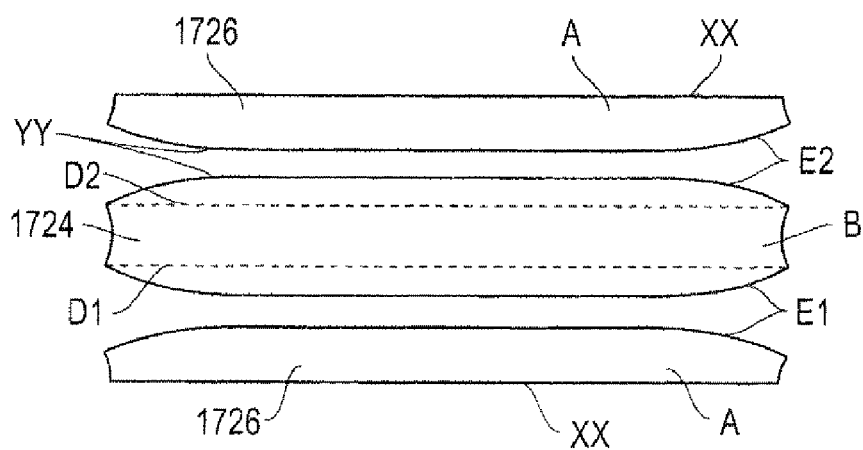
FIG. 3 is a simplified top view of one embodiment of a single-layer shell section comprising an "A" gore panel and a "B" gore panel unfolded and separated.

Referring now to FIGS. 2B and 3, the inflatable shell 710 comprises a plurality of separately assembled, folded shell sections 720, each placed side-by-side into position about the circumference of the core 712. Each shell section 720 in this exemplary embodiment comprises a whole B gore section 724 and two half A gore sections 726 attached on each end of and positioned unfolded atop the whole B gore section 724. In other words, at each layer of the gore sections, a gore panel of the two half A gore sections 726 is attached to a corresponding gore panel of the centralized B gore sections 724 at the side edges "YY" during preassembly of the inflatable folded shell sections 720 and before installation about the structural core 712. Once positioned about the core 712, each folded shell section 720 is integrated into an inflatable shell 710 by attachment to adjacent assembled, folded shell sections 720. For instance, for the embodiment having half A gore sections, the two adjacent half A gore sections are attached together at each layer at the other side edges XX, thereby connecting two assembled folded shell sections 720 together. The side edges XX, which may be connected together by sewing or equivalent techniques, in essence define the boundaries of each folded shell section 720 (e.g., 720 and 720'). For this embodiment, each assembled shell section 720 comprises a plurality of gore sections, specifically two half A gore sections and one B gore section combine to form one shell section.

In an alternate embodiment, the folded shell sections comprise one whole A gore section and again one whole B gore section, rather than two half A gore sections and a single whole B gore section. The single whole B gore section is attached, during preassembly, to the single whole A gore section at one side edge YY. The assembled, folded B gore section (attached to the overlapping A gore section) is placed about the structural core and then attached to an adjacent unfolded A gore section at the other, unattached side edge YY, as shown in the side view of FIG. 8. In this alternate embodiment and configuration, the side edges XX shown in FIG. 2B are no longer needed. In yet another alternative embodiment, a combination of whole A and half A gore sections may be implemented, as described in more detail with respect to FIG. 5D below.

Each layer of a gore section comprises at least one gore panel having a particular shape or pattern. FIG. 3 illustrates one exemplary embodiment of a flat pattern provided by manufacturing (i.e., cutting) the gore panel according to the inventive methods described herein. The method of manufacturing a flat pattern comprises the step of determining the flat shape dimensions and a set of fold lines for each layer of a gore section comprising a plurality of gore panels 1724, 1726. The use of two sets of fold lines—D1/D2 and E1/E2 (fold lines E1/E2 correspond with the location of the side edges YY of both gore panels)—results in a simplified folding and assembly pattern for the inflatable shell.

As described in more detail below, the sets of fold lines—D1/D2 and E1/E2—as well as the other dimensions of each panel, are defined by a set of equations according to another exemplary embodiment. Each gore panel, forming a panel element, is manufactured according to precise dimensions, such as by laser cutting. The location or positioning of the set of fold lines—D1/D2, E1/E2—are slightly different for each layer of the gore section, depending on the thickness of each layer of gore panels and the interference between folds required for assembly. Each of the gore panels may be marked with fold lines to guide folding during initial assembly of the shell sections.

FIG. 4A shows an exploded view of an embodiment of a multi-layer B gore section 724. Each layer of the gore section has been shaped according to dimensions calculated such that the multiple layers of gore panels may be laid out, matched to one another, and then folded onto one another to form a generally flat surface. Each layer of the gore panel may be marked with the set of D1/D2 fold lines. Layer 910 of a first whole B gore panel is laid across a flat surface. The first layer 910 in this example comprises a micro-meteoroid orbital debris (MMOD) protective layer 910. Such protective layer may be made from aluminum, glass fibers, carbon fibers, and/or any other suitable material. The first MMOD layer 910 may have a height, also called length, that is slightly greater than the height of the structural core 712. As shown in FIG. 4B, the exemplary layer 910 has side edges that are defined by the set of fold lines E1 and E2. The set of fold lines E1/E2, which in this example correspond with the side edges of the B gore panel, are generally straight in the central region but are curved inward near the top and bottom of the panel. The layer 910 is therefore tapered (narrower in width) near the top and bottom portions of the gore panel. The narrow or curved regions are designed to accommodate or correspond with the toroid regions of the inflatable vessel 700.

As shown in FIG. 4A, vacuum pack foam 912 may be provided atop MMOD layer 910. The layer 910 may be equipped with a series of attachment means such as straps 1116 (including hook and loop fasteners such as Velcro®) along the side edges E1/E2. Both the A and B gore sections may have such straps 1116. The straps 1116 provide a means of attaching the side edges E1, E2 of the gore panel 910 to a corresponding side edge of a layer of a gore panel of an A gore section 726. The layer 910 is also equipped with a pair of weight relief straps 1118 at each end. The function of the weight relief straps 1118 will be discussed in more detail below.

A second MMOD layer 920 may be laid atop and matched to the first MMOD layer 910 and foam pack 912. Note that each additional layer of gore panels 920, 930, 940, and 950 may also have attachment straps 1116 and weight relief straps 1118 attached thereto, but these straps have been omitted in FIG. 4A for clarity. Another foam pack 912 is placed atop the second MMOD layer 920. Next, a third MMOD layer 930 may be placed above the second foam pack 912. Thus, the first three layers in this embodiment are (MMOD) protection layers (910, 920, 930), which are separated by vacuum-packed foam layers 912. The foam layers 912 may be cut to dimensions narrower in width than the protection layers 910, 920, 930. When placed between the primary layers, the foam layers 912 may provide a surface edge where the fold lines D1/D2 are located such that the protection layers can be more readily folded along the fold lines D1, D2 without interference from the foam layers 912.

A multi-layer thermal insulation layer 940 is positioned over the third MMOD layer 930, providing the fourth layer of a gore panel 940 of the B gore section 724. Next, a fifth layer of an atomic oxygen shielding beta cloth 950 is placed over the fourth layer 940. The beta cloth layer 950 provides the top layer of the multi-layer B gore section and completes the step of layering the B gore panels. The beta cloth layer 950 is the outer layer exposed to the environment. For this embodiment, the dimensions of each of the five successive layers of gore panels 910, 920, 930, 940, 950 approximate those of the previously laid layers. In one exemplary embodiment, the dimensions of each layer of the gore panels for a gore section is determined by performing a set of mathematical calculations so as to accommodate the thicknesses required for folding and integrating the multiple layers of the B gore section 724 and further of the assembled, folded shell section. This method will be described in further detail below.

The exemplary configuration of FIG. 4A is provided to facilitate description of the various aspects of one embodiment, and the described illustrated configuration should not be construed to limit the invention. Thus, the method of assembling an inflatable shell may be applicable to other multi-layer or multi-panel shell sections. Such other shell sections will typically be application specific and may contain more or less layers than what is illustrated in FIG. 4A.

The construction of the embodiment of FIG. 4A provides a multi-layer B gore section 724 complete and ready for folding. In one embodiment, the multiple layers of the flat B gore section 724 are next folded together inwardly along the set of fold lines D1, D2 as shown in FIG. 5A. The set of fold lines D1, D2 may be physically marked on each layer of gore panels. Multiple layers are folded together without interference at the fold lines. The configuration and shape of the flat B gore section are mathematically defined for each layer of the gore panels so as to allow for the layers to be integrated together into a substantially flat, foldable assembly.

Figure 5B:
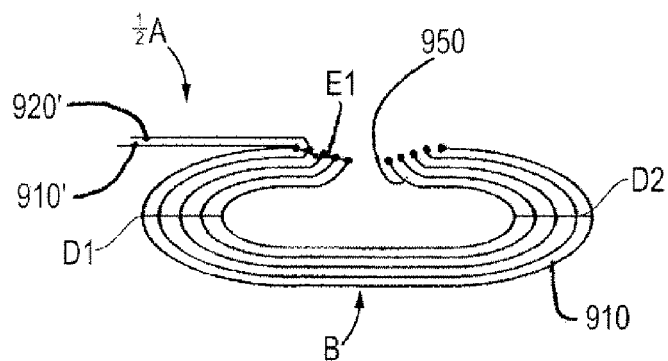
FIG. 5B is a cross-sectional view showing partial assembly of half "A" gore panels connected to a folded "B" gore section.
Figure 5C:
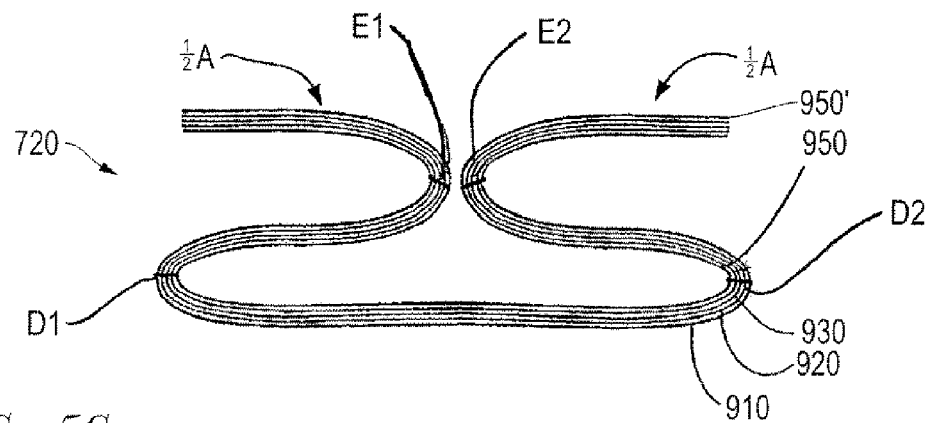
FIG. 5C is a cross-sectional view showing an assembled shell section comprising a plurality of half "A" gore panels connected to a folded "B" gore section at each layer of the "B" gore panels.

The next step in the assembly process entails the act of attaching half A gore wing sections to each of the layers of the whole B gore section of FIG. 5A. FIGS. 5B and 5C illustrate some of the progressive stages of the method of assembly, wherein half A gore panels are integrated with the folded B gore section. Each layer of a half A gore panel of the half A gore section is attached to the corresponding layer of the B gore panel of the whole B gore section at mutual side edges, such side edges corresponding to fold lines E1, E2. Referring specifically now to FIG. 5B, the first or bottom B gore panel 910 of gore section B is attached to a bottom half A gore panel 910' of a half A gore section utilizing the means for attaching 1116 provided on both the B section and half A section gore panels. This step of attaching is repeated for each of the four remaining pairs of panels of the half A and whole B gore sections on one end of the panels, such as the end denoted by the fold line E1. After all five layers of gore panels of the half A-gore sections are attached to the side edges of the B-gore sections at fold line E1, the same steps are performed on the other side for the five layers of A and B gore panels being attached to one another on the other fold line E2, ending with the beta cloth layer 950' being attached to fold line (or side edge) E2 of the corresponding B gore panel 950 of the B gore section, as illustrated in FIG. 5C. In this particular example, the assembled shell section 720 comprises five primary layers of gore panels to form the whole B gore section and the two half A gore sections. Once in the assembled configuration, the primary layers of a shell section each extend continuously from a half A gore wing section on one side edge of the whole B gore section, through the whole B gore section, and then onto a half A gore wing section on the other side edge of the whole B gore section. In other words, each layer of the shell section comprises two half gore panels and one whole gore panel that are joined together along fold lines (side edges) E1, E2.

In an alternate embodiment, the second set of gore panels of the second half A gore section may be attached in a staggered sequence with those of the first half A gore sections (i.e., alternating sides of the B gore panel). The resulting shell section, in either sequence or any other sequence of attachment chosen, is the assembled, folded structure of the shell section 720 shown in FIG. 5C. Notably, the assembled structure is a multi-layered, multi-panel configuration that is folded about two sets of fold lines: D1, D2, E1, E2. As mentioned with the other embodiment, the set of fold lines D1, D2 are located within the B gore panel, whereas the fold lines E1, E2 actually correspond with the side edges of the panels. By designing each layer of the gore panels to be of a particular size and shape, one gore section comprises gore panels that are layered but not folded during assembly into a stowed configuration. The configuration also enables the gore panels of the A gore sections to be positioned such that they lie above the panels of the B gore section.

Figure 5D:
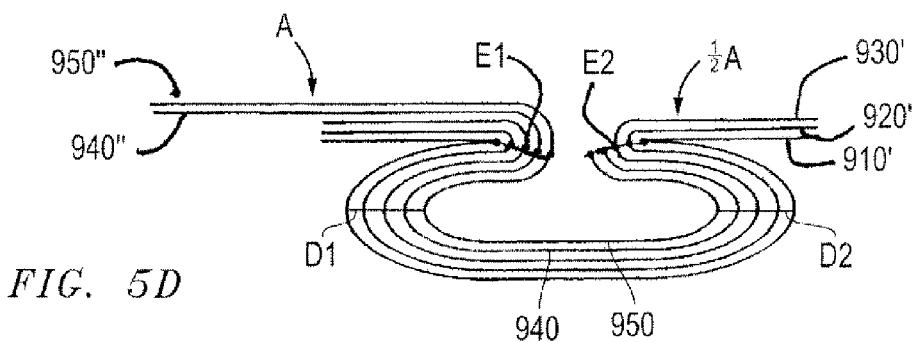
FIG. 5D is a cross-sectional view showing an assembled shell section comprising both half "A" gore panels and whole "A" gore panels connected to a folded "B" gore section.

Yet another variation appears in FIG. 5D. In this embodiment, the fourth and fifth panels of the half A gore section comprise whole width A gore panels. The whole width panels 940", 950" are attached to the corresponding gore panel comprising thermal insulation layer 940 and the beta cloth layer 950 of the whole B gore section. This sequence of attachment reduces the number of exposed side edges XX (FIG. 2B) that require seaming together on the inflatable shell 710, enhancing the protection from the external environment.

The assembly process described above may be repeated as many times as necessary to provide the requisite number of assembled, folded shell sections 720 to surround the circumference of the core 712. Each of the assembled shell sections may be uniquely identified such that each can be specifically located in a particular position about the core.

Figure 6:
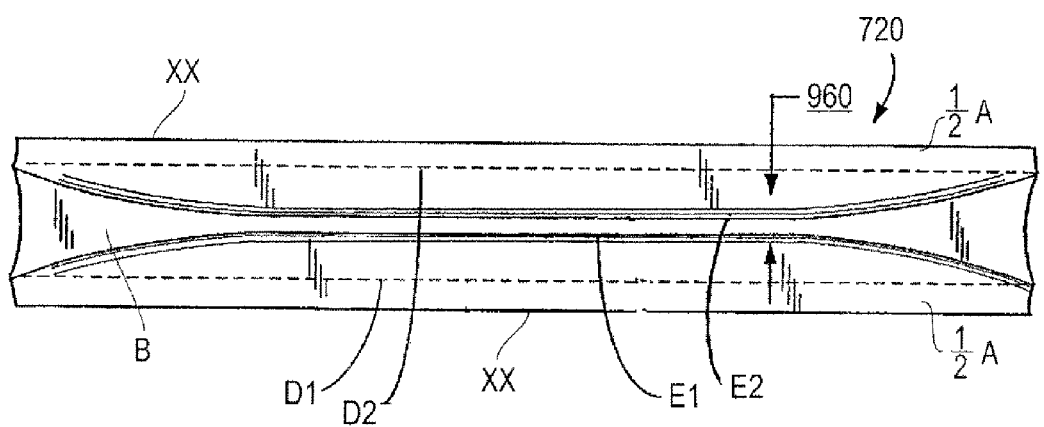
FIG. 6 is a top view of an embodiment of an assembled inflatable shell section.

FIG. 6 is a top view of an embodiment of an assembled shell section 720 using the method previously described. For this embodiment, the assembled shell section 720 comprises a whole B gore section and two half A gore wing sections. With the shell section 720 in the assembled, folded configuration, the inside edges (E1, E2) of the half A gore sections are spaced apart to provide a gap 960 extending longitudinally through the center of the shell section 720. The gap 960 exposes the center portion of the B gore section that serves as the interior portion of the folded shell section 720. During the later stages of assembly, the gap 960 may be used by deployment system 800 (see FIG. 2A) to attach adjacent fold lines E1 and E2 together. The half A gore sections are attached, as wing sections, to the whole B gore sections at the side edges E1, E2. In another embodiment, the half A gore section may already be attached to the whole B gore section and the shell section 720 is pre-marked with fold lines E1, E2 to locate where the section is folded to create the half A gore wing sections. As shown in FIG. 6, the shell section 720 is folded about the defined set of fold lines D1, D2, E1, and E2. Straight line folds D1, D2 are contained in the whole B gore section and generally extend the length of the B gore. The fold lines D1, D2 are uniquely located on each layer or gore panel of the B gore section. The distance between the two substantially parallel fold lines D1, D2 may determine the width of each panel of the whole B gore section. Again, the second set of fold lines E1, E2 correspond with the side edges of the panels. The second set of fold lines E1, E2 define the seams YY (see FIG. 2B) at which each half A gore section is attached to the whole B gore section. The second set of fold lines E1, E2 also generally extend the length of the A and B gore panels. Referring again to FIG. 6, the fold lines E1, E2 have a straight line portion and, in this embodiment, curved portions at the ends. The straight line portion is intended to accommodate or correspond with the cylindrical region of the inflatable shell while the curved portions are intended to accommodate or correspond with the torpid regions. In one aspect of the embodiments described herein, the fold lines E1, E2 are mathematically-defined to provide a curvature to the shape of a flat gore panel such that the inflatable shell 710, once deployed by inflation, will form into a properly curved toroidal shape in that region.

Figure 7:
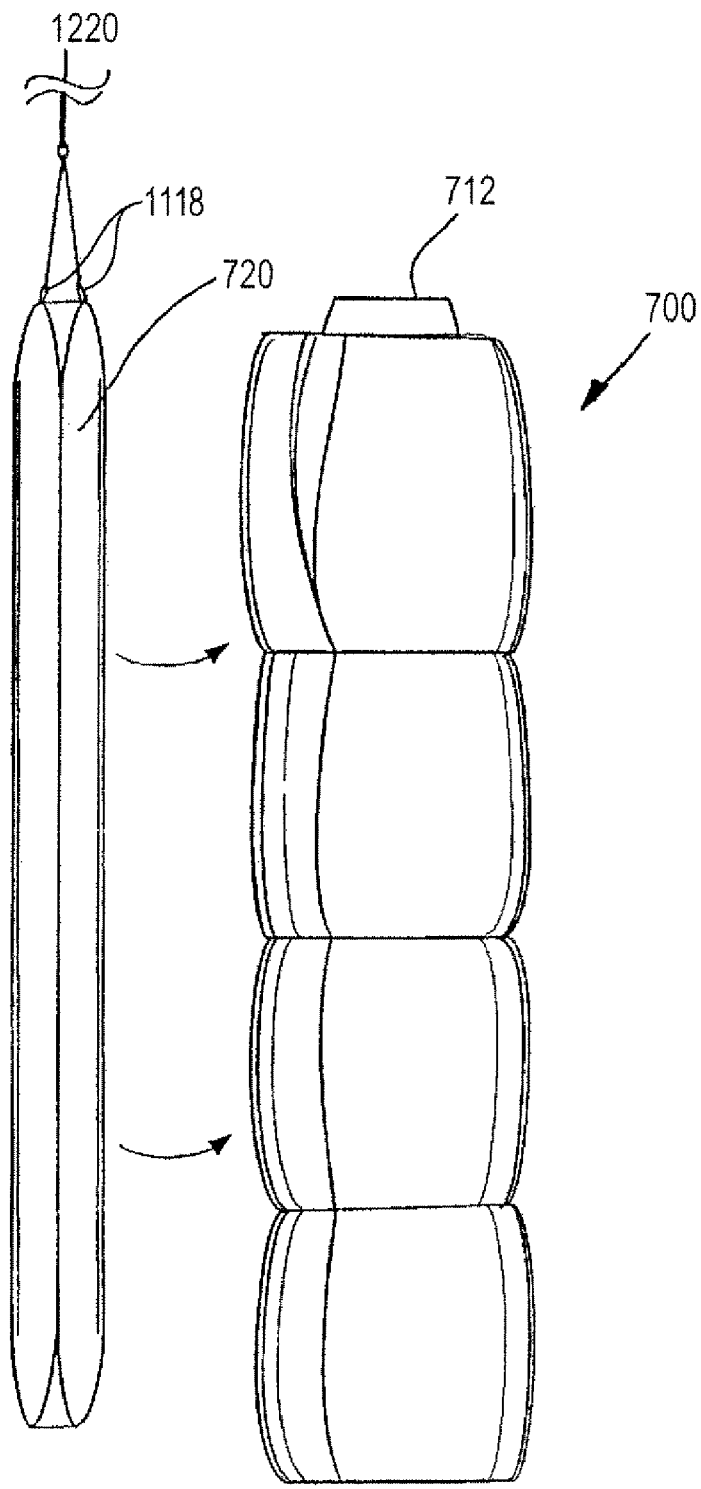
FIG. 7 is a simplified view of an inflatable vessel being assembled together as preassembled shell sections are being integrated about a structural core.
Figure 8:
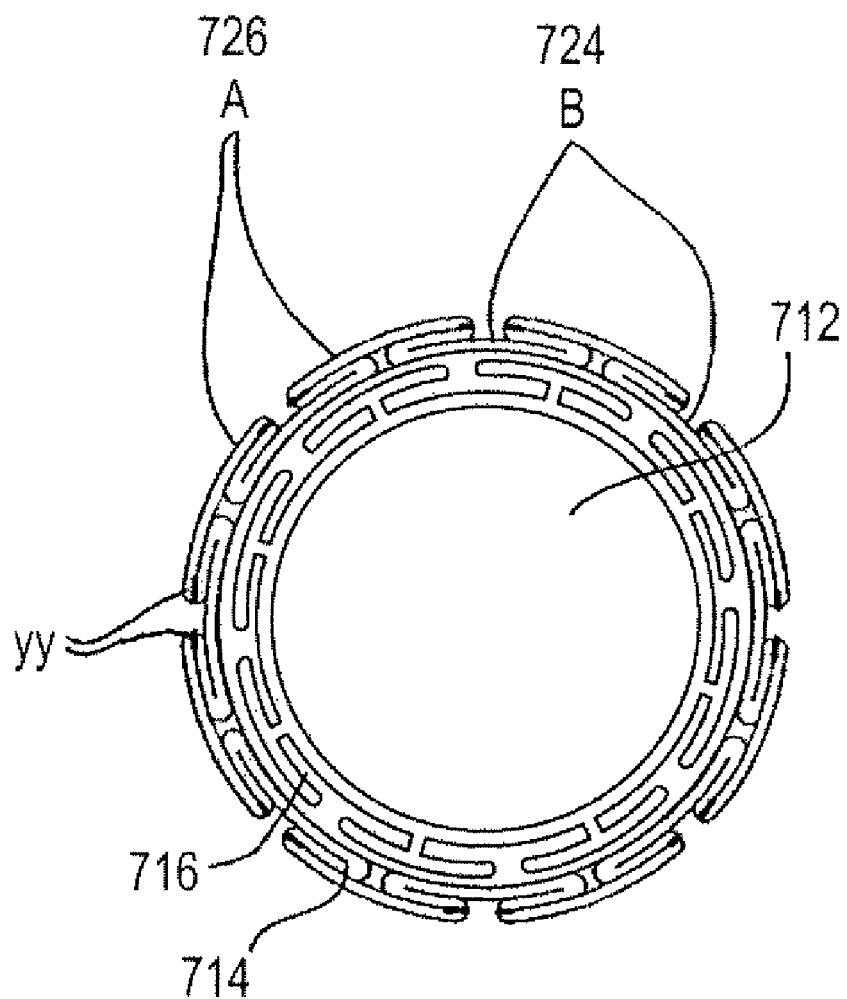
FIG. 8 is a cross-sectional view along line 2B-2B of FIG. 2A showing another embodiment comprising whole "A" gore sections for the outer layers of the inflatable shell.

In yet another embodiment, each assembled shell section 720 may be positioned about the structural core 712 as illustrated in FIG. 7. The shell section 720 may be supported by an overhead crane having a hoist 1220 capable of moving section 720 into place. The weight relief straps 1118 are specifically employed as load bearing points, facilitating transport and placement of the assembled shell section 720. Each folded shell section 720 is moved toward and placed into its designated location about the core 712. Each folded shell section 720 is ultimately attached at two side seams to an adjacent folded shell section. Each half A gore section is attached to an adjacent half A gore section, such as by sewing the side edges XX together as shown in FIG. 2B. By attaching the assembled shell sections 720 to one another about the structural core 712, the shell sections 720 are integrated and the inflatable shell 710 is assembled in the uninflated configuration. The resulting inflatable vessel 700, in its stowed configuration, is depicted again in FIG. 7. In an alternate embodiment, where a whole A gore is used on the outer two layers as shown in FIG. 5D, the inner layers may be connected at side edges XX, and the outer two layers connected at side edges YY, as shown in FIG. 8, such that there are no seams or side edges XX on the outer layers of the inflatable shell.

With the inflatable shell 710 folded and installed about the structural core 712, inflatable shell 710 may be constrained in its folded, uninflated state using a deployment strap of deployment system 800. When the inflatable vessel 700 is deployed and the inflatable shell 710 begins to inflate, the inflatable shell 710 unfolds and takes shape as designed.

Figure 9:
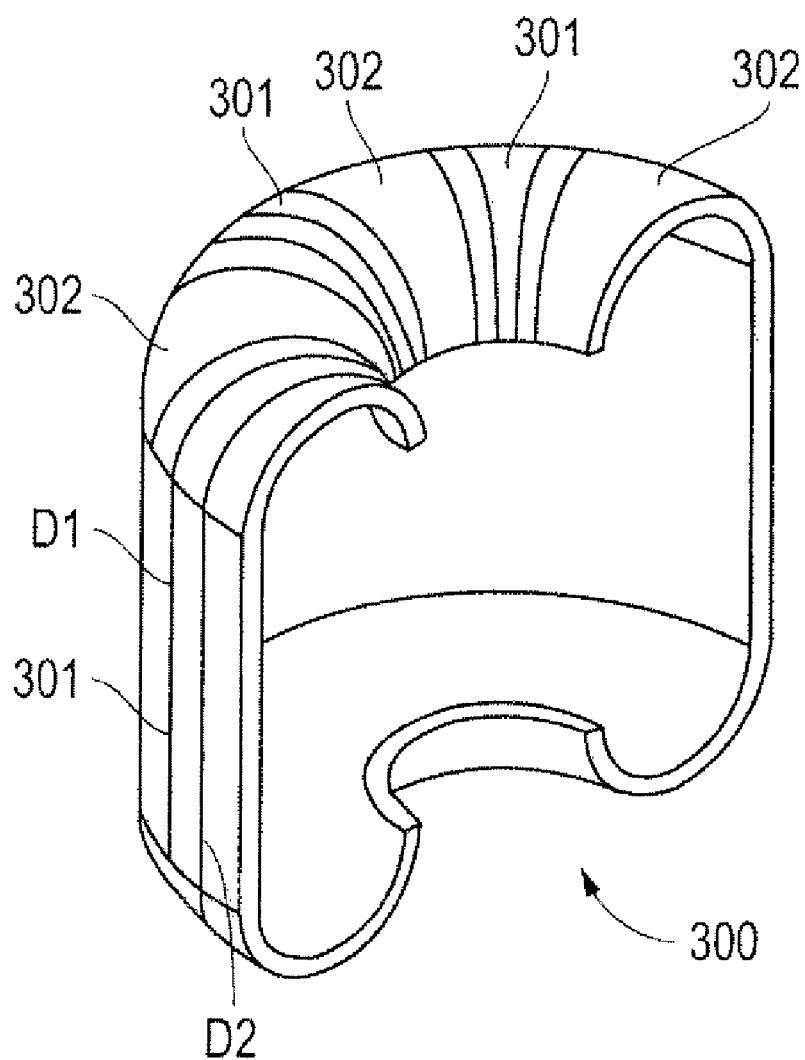
FIG. 9 is a view of a single piece inflatable bladder having fold lines for folding into a collapsed state.

While described above as a multi-layer, multi-panel inflatable vessel, exemplary embodiments of the present invention may also comprise other configurations, such as a single layer of multiple gore panels. Yet another embodiment of the folding technique is applicable to describing the fold lines of a single piece inflatable structure. For instance, referring to FIG. 9, restraint sub-assembly 716 (FIG. 2B) may comprise a single piece restraint layer 300. The folding method of the exemplary embodiments may be used to define straight fold lines D1 and D2 on gore sections 301 and 302. Gore sections 301 and 302 may comprise assembled portions of bladder 300 formed together as a result of a particular manufacturing technique. Alternatively, gore sections 301 and 302 may be "imaginary" sectional panels defined for purposes of efficiently folding a seamless bladder. It is noted that fold lines D1 and D2 are present only in gore sections 301. In view of the previous description, gore section 301 is comparable to a whole gore panel of a B gore section, and gore section 302 is comparable to a whole gore panel of an A gore section. The bladder 300, when folded using the set of fold lines D1 and D2, will resemble the folded restraint sub-assembly 716 of FIG. 2B.

Design of a Gore Panel

In another exemplary embodiment, a method is provided for designing a gore panel that is attached for assembly to at least one other gore panel to form a shell section. The method comprises the steps of obtaining a set of input variables that reflect a set of design requirements for an inflatable vessel and of performing a set of calculations with equations that have representative numerical values corresponding to the set of input variables to define the output parameters of the gore panel and its corresponding fold lines. An additional set of equations considers the interrelationship between multiple layers of gore panels to a gore section and between adjacent gore panels of each layer connected and folded together to form a shell section. As already described, each shell section 720 can be assembled into a folded configuration and utilized as a building block for assembling a folded inflatable shell. In yet another exemplary embodiment, a computer-implemented method for designing and manufacturing a gore panel is provided. The computer-implemented method comprises the step of providing a set of instructions to a computer to perform the set of calculations that mathematically define the parameters of a gore panel having a particular shape and at least one set of fold lines. The computer-implemented method may provide a second set of fold lines that correspond to the regions of curvature found in the toroid region of an inflatable shell for the inflatable vessel.

Referring now to FIG. 4B, a flat, two-dimensional representation (i.e., a pattern or shape) of a gore panel is shown. The flat pattern applies generally to any one of the gore panels that comprise a whole B gore section, a half A gore section, or a whole A gore section as described previously. FIG. 4B shows the first set of straight fold lines D1, D2, and the set of curvature fold lines E1, E2, which may be mathematically determined at a particular location after performing a set of calculations using equations that describe the relationship among the set of input variables that reflect the design requirements of an inflatable shell. The set of fold lines E1 and E2 comprise a straight line portion that corresponds to the cylindrical portion of the shell once inflated and a pair of curved, narrower portions that correspond to the toroid regions of the shell once inflated. Gore panels of other different geometrical shapes may also be used having at least one set of fold lines different from the two sets illustrated in FIG. 4B.

As a first step in the method of designing a gore panel, including the exemplary computer-implemented method, a user of a system employing such method first determines a set of design requirements for the inflatable vessel. The set of design requirements may then be represented by a set of input variables. The set of design requirements may comprise the following input variables: top and bottom diameter of the core, top and bottom angle of attachment of the restraint layer to the core, core diameter profile, diameter of the restraint layer, height of the core, number of gore sections, thickness of the material used for the gore panel at each layer or level of the gore section, spacing between each layer or level of the shell section while in the stowed configuration, spacing between each layer or level of the shell section when in the deployed configuration, and the ratio of the width of the B-gore panel when folded to the width of the A-gore panel for each layer or "level" of the shell section. In other words, the method comprises obtaining the set of input variables that reflect the set of design requirements for the inflatable vessel.

Next, the method comprises the step of calculating the output parameters of the gore panel based on the set of input variables previously obtained as input. The output parameters define the required dimensions of a gore panel for each layer of the gore section. The output parameters may comprise the following: top stowed circumference and bottom stowed circumference at each layer or level of the shell, deployed circumference for each layer of the shell, top and bottom toroid radius for each layer of the shell, top and bottom toroid arc length for each layer of the shell section, top and bottom cylinder height for a gore panel at each layer of a shell section, top and bottom maximum fold width for each layer of a shell section, total cylinder height of a shell section for each layer or level, ratio of the cylinder width of a "B" gore panel to an "A" gore panel for each shell layer or level, total length of a gore panel at each shell layer or level, "B" gore panel cylinder width at each shell layer, "A" gore panel width at each shell layer, "B" gore folding width at each shell layer, maximum thickness for a folded shell section, and thickness of a shell section once inflated or deployed.

Further detail regarding the specific relationship of the output parameters just identified to the set of input variables used as input, represented by a set of equations used to perform the step of calculating, will occur below with reference to FIG. 10, which identifies the design requirements of an inflated vessel by various geometrical data corresponding to the set of input variables. The relationship will also be detailed in the Example described below in reference to FIGS. 12 and 13.

For one embodiment, the step of calculating comprises using the equation for the curved toroid section of each gore panel first. Once this calculation is performed, the set of fold lines D1, D2 for the B gore panel, as well as the parameter of the cylinder width for each gore pattern, may be defined.

The method for designing a gore panel may further comprise the step of performing a sub-routine of interference checks after the initial set of calculations to ensure that each gore panel has enough material to allow it to be folded around either other interior or other exterior shell sections at each shell layer or level. Another subsequent interference check may be employed to ensure that adjacent folds occur between an A-gore panel and a B-gore panel, and that the panels will overlap each other. The pattern or shape of the gore panel may be verified as well.

Figure 10:
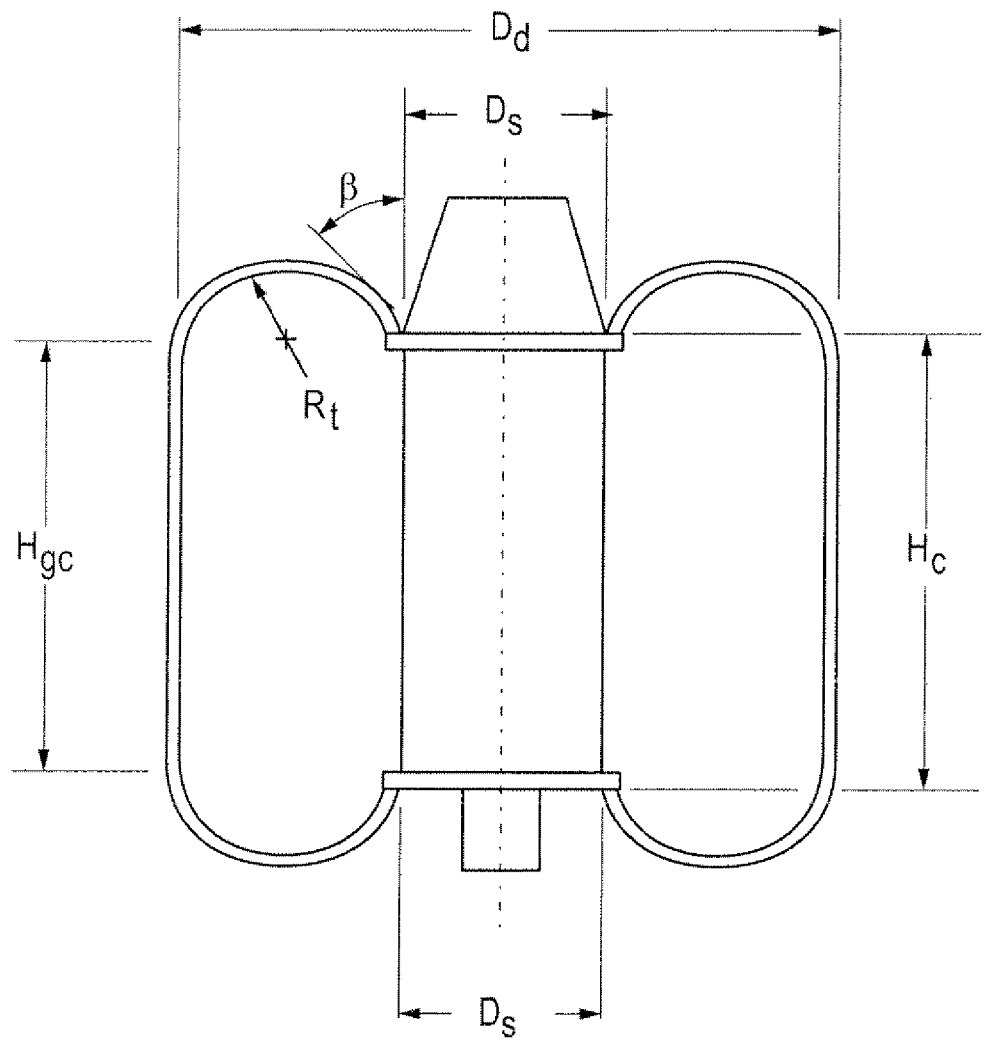
FIG. 10 is a cross-sectional side view of an inflatable vessel showing some of the geometric input parameters for calculating the dimensions of a gore section.

Referring now to FIG. 10, an exemplary set of input variables is identified that reflects a set of design requirements for an exemplary embodiment of an inflatable vessel 10 or 700 comprising a cylindrical region 230 and two toroidal regions 204 (see FIG. 1A). As shown in FIG. 10, the set of input variables are denoted by the following symbols:

| | |
| --- | --- |
| Stowed Restraint Diameter | Ds (input) |
| Deployed Restraint Diameter | Dd (input) |
| Core Height | Hc (input) |
| Total Gore Number | Ng (input) |
| Restraint Clevis Angle | $\beta$ (input) (in radians) |
| Fold Width (B/A) Ratio | Ratio (input). |

Given this set of input variables, a relationship for calculating the output parameters of toroid radius, toroid arc length, gore panel cylinder height, and gore panel length may be given by the following set of equations:

| | |
| --- | --- |
| Toroid Radius | $Rt = (Dd - Ds)/(2 * (1 + \cos(\beta)))$ |
| Toroid Arc Length | $Lt = (\pi - \beta) * Rt$ |
| Gore Cylinder Height | $Hgc = Hc - (2 * Rt * \sin(\beta))$ |
| Gore Length | $Lg = Hgc + 2 * Lt$ |

Figure 11:
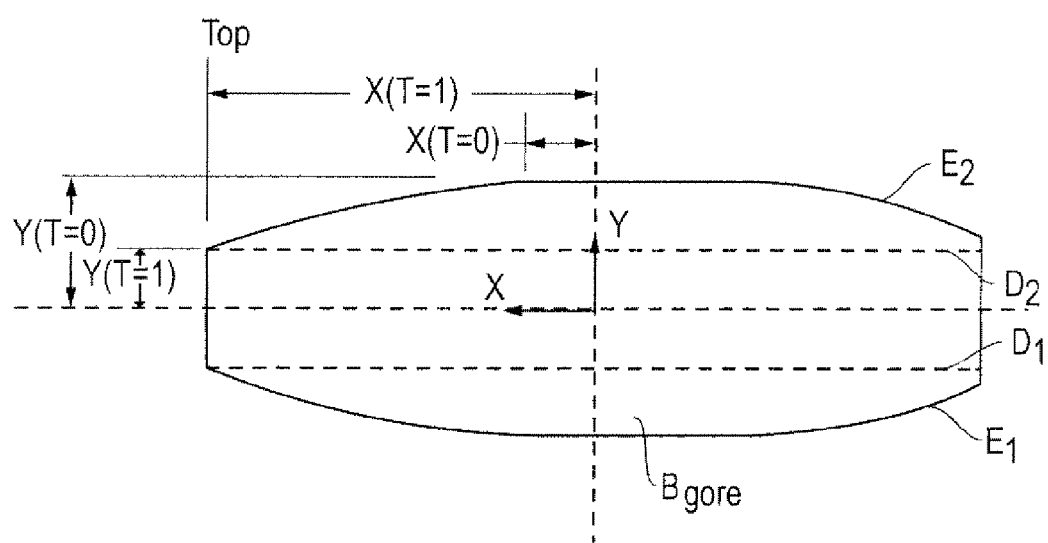
FIG. 11 is a template showing the output data and coordinate system for a "B" gore panel.

The set of curvature fold lines E1 and E2 have a straight line region corresponding to the cylindrical region 230 and two regions with curvature corresponding to the toroid regions 204. In the cylindrical region, the curvature fold line (E1 or E2) may be represented as a straight line at a position that corresponds to the end of the curve of the toroid region. Referring to FIG. 11, the curved portion of the curvature fold lines may be defined for a two-dimensional, flat representation of a gore panel as shown in terms of the co-ordinates x, y, and z, based on the variable "T" (or "t", as indicated in the equations given later below), which is a positioning variable that varies from the value 0 to 1 (in the toroid region only). As shown in FIG. 1I, the origin of the x, y, z coordinate system may be centered on the B gore panel. Given this arrangement, the location of the curvature fold lines E1, E2 for a gore panel may be represented by the following set of equations:

Gore Panel "A":

$$x(t) = Hgc/2 + Lt^*(t)$$

$$y(t) = (\pi^* Ds)/(((Ratio+1)^* Ng) + (\pi^* Rt/Ng)^* \cos(\beta) + (\pi^* Rt/Ng)^* \cos(\pi - \beta)$$

$$z(t) = 0$$

Gore Panel "B":

$$x(t) = Hgc/2 + Lt^*(t)$$

$$y(t) = (\pi^* Ds^* Ratio)/(((Ratio+1)^* Ng) + (n^* Rt/Ng)^* \cos(\beta) + (\pi^* Rt/Ng)^* \cos(\pi - \beta)$$

$$z(t) = 0$$

The concept of symmetry about the x- or y-axis can be used to define the mirroring of the curvature fold lines on each half of the gore panel. In the cylindrical region, the curvature fold lines are defined by connecting the ends of the fold lines in the toroid region line together with a straight line.

For determining the parameters (i.e., its location) of the set of straight fold lines D1 and D2 of the folded gore panel B as they relate to the set of fold lines E1,E2, the set of fold lines may once again be defined for a two-dimensional, flat representation of the gore panel as shown in FIG. 11 in terms of the co-ordinates x, y, and z, based on the variable "T" (or "t", as indicated in the equations given later below), which is again a positioning variable that varies from the value 0 to 1 (in the toroid region only). The equations given below define the curve of the fold lines for ¼ of the B gore panel. Here, the variable "t" varies along the length of the gore panel, i.e., in the direction of the x-axis. Again, the concept of symmetry can be used to define the mirroring of the straight fold lines. Note that only the "B" gore panel has the set of fold lines D1, D2.

Gore "B"

$$x(t) = (Hgc/2 + Lt)^*(t)$$

$$y(t) = (\pi/Ng)^* Ds$$

$$z(t) = 0$$

For determining the location of a side edge of the A gore panel, the graphical representation of the curve is defined in terms of half of the A gore panel. For a two-dimensional, flat representation of a half A gore panel in terms of the co-ordinates x, y, and z and the variable "T" (or "t", as indicated in the equations given later below), the curve of the side edge of the A gore panel may be represented by the following:

Gore "A"

$$x(t) = (Hgc/2 + Lt)^*(t)$$

$$y(t) = 0$$

$$z(t) = 0$$

Again, t varies along the length of the gore pattern, i.e., along the x-axis. The concept of symmetry can be used to define the mirroring of the side edge curve.

For a shell section comprising multiple layers of gore panels, another embodiment of the method for designing the gore panels further comprises the step of calculating the necessary hinge widths of the gore panels for each layer or level. In order to obtain these values, another set of input variables that reflect an additional set of design requirements must be obtained. The second set of input variables are identified in the list below with their corresponding symbols:

| | |
|---|---|
| Fold Width (B/A) Ratio | Ratio.i (input) |
| Level Material Thickness (each level) | T.i (input) |
| Stowed Level Spacing (each level) | Ss.i (input) |
| Deployed Level Spacing | Sd.i (input) |

Given this set of input variables, a relationship for calculating the output parameters of the curvature fold hinge width at each layer, the necessary curvature fold hinge width at each layer, the straight fold hinge width at each layer, and the necessary straight fold hinge width at each layer may be given by the following set of equations (as identified by the corresponding symbols):

Symbols:

| | |
|---|---|
| Curvature Fold Hinge Width (each layer or level) | Cw.i |
| Necessary Curvature Fold Hinge Width (each layer) | Cwn.i |
| Straight Fold Hinge Width (each layer) | Sw.i. |
| Necessary Straight Fold Hinge Width (each layer) | Swn.i |

Equations:

$$Cw.i = [(\pi^* Ds)/(2^*(Ratio+1)^* Ng) + (\pi^* Rt(Ratio+1))/((Ratio+1)^* Ng)].i - [(\pi^* Ds)/(2^*(Ratio+1)^* Ng) + (\pi^* Rt^*(Ratio+1))/((Ratio+1)^* Ng)].i - 1$$

$$Cwn.i = \text{"thickness buildup of levels that each level must fold around"}$$

$$Sw.i = [(\pi^* Ds^* Ratio)/((Ratio+1)^* Ng)].i - \text{"smallest } Sw.i\text{"}$$

$$Swn.i = \text{"thickness buildup of levels that each level must fold around"}$$

To ensure proper fit at each layer of the integrated shell section in its folded configuration, the ratio of the fold width between the B gore panel and the A gore panel (the "B/A" ratio) should be chosen for each layer such that the following conditions for the hinge widths, Cw.i, Sw.i are met:

$$Cw.i > Cwn.i$$

$$Sw.i > Swn.i.$$

As will be described in more detail below, the output parameters that are calculated may be used by a system to provide a plurality of gore panels that are then folded and assembled together before vehicle installation. If the inflatable shell is integrated onto the vehicle in sections, these sections may be installed onto the vessel structure. The weight relief straps may be conveniently used during this process. Alternatively, if the restraint layer or any other single piece of the inflatable shell is to be integrated onto a vehicle as one complete component, rather than in sections, before folding, the method for designing a gore panel using the equations described above may still be used by a system to indicate by marking with ink or marking means where folding should occur on these components.

The method for designing a gore panel described herein may be performed by one or more programmable processors executing a computer program to perform functions by operating on input data and generating an output. The computer program comprises a set of instructions to perform in the step of calculating the output parameters that mathematically define a gore panel having a particular size and shape and at least one set of fold lines. The equations presented above may be programmed using techniques known in the art. In one embodiment, the equations may be programmed into a commercially available spreadsheet type program, as given by the following example.

Example

FIG. 12 shows an example of a set of input variables or input data 1210 for three layers (denoted as Level 1, Level 2, and Level 3) of a four layer shell section assembly, and the overall calculated output data 1220 for each layer. The output parameters or output data may be further processed to establish the x-axis, y-axis, and z-axis coordinates for fabricating each of the A and B gore panels for the overall assembly.

Figure 14:
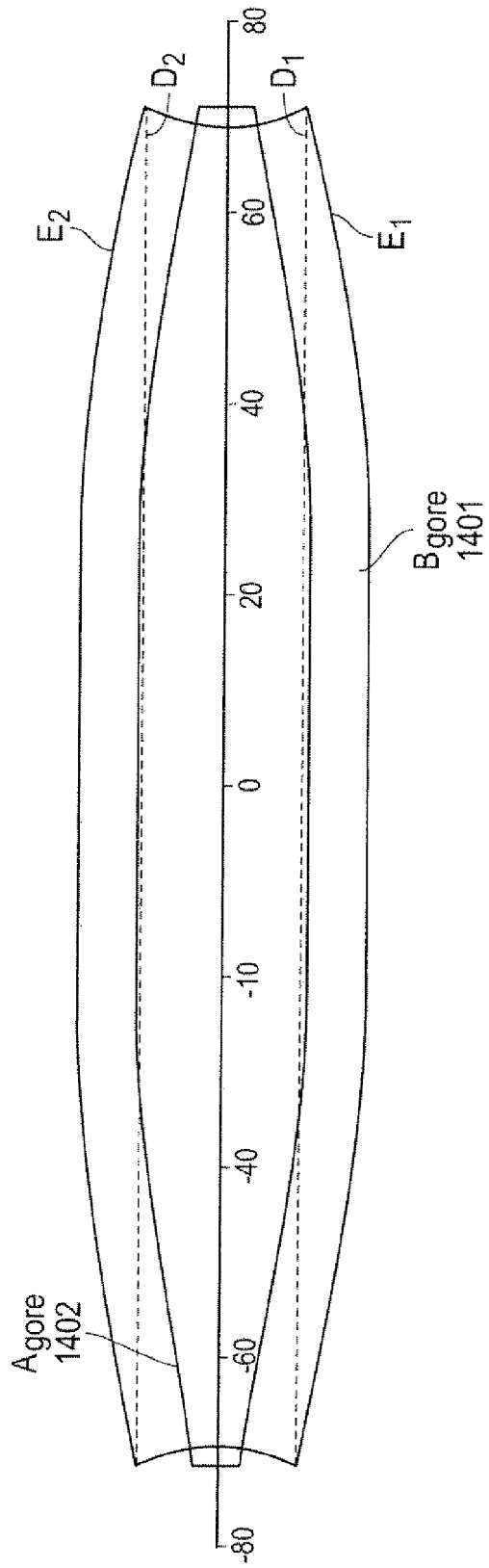
FIG. 14 shows the plotted results of output data of FIG. 13 for one layer of the "A" gore section and "B" gore section.

Continuing with the same example, FIG. 13 shows the x- and y-axis coordinates that have been calculated using a computer-implemented method for both a Level (i.e., layer) 1, A gore panel and a Level 1, B gore panel after calculating the output parameters given in FIG. 12. The results of the co-ordinate values shown in FIG. 13 are plotted in FIG. 14 for both the B gore panel 1401 and a whole A gore panel 1402 for Level 1 when unfolded.

Figure 15:
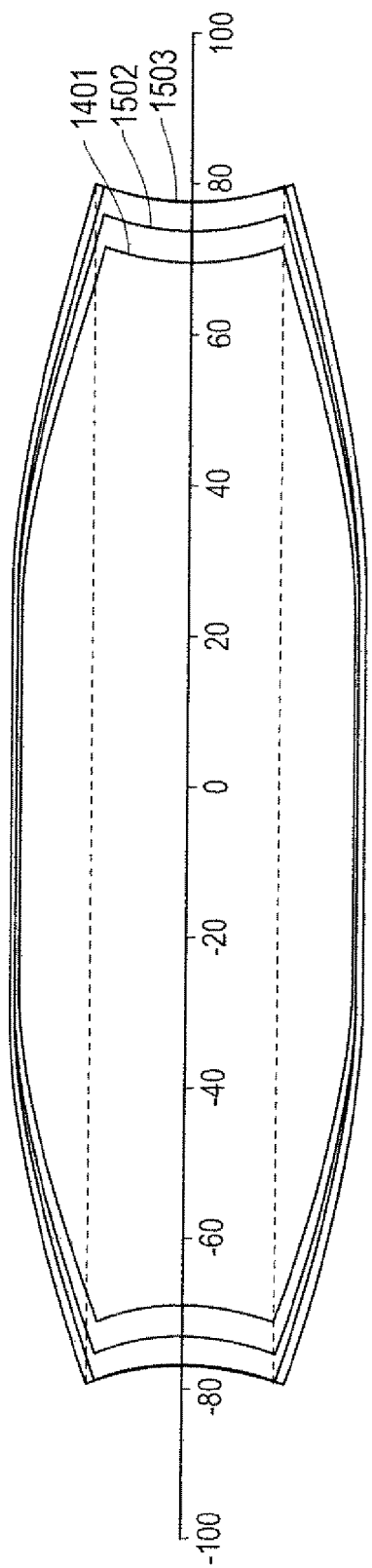
FIG. 15 shows the plotted results of output data for multiple layers of a "B" gore panel stacked on top of one another to show their relation of size to each other in forming a "B" gore panel.

FIG. 15 shows multiple layers of B gore panels 1401, 1502, and 1503 for Levels 1, 2, and 3. The gore panels are overlaid to demonstrate the increase in size of the outerlying layers necessary to accommodate the increased radius from the centerline of the inflatable shell as well as to accommodate the increased radius around the toroid fold. Although not represented in FIG. 15, the A gore panels also exhibit a similar increase for each layer to accommodate the same two increases in radius.

System for Fabricating a Gore Panel

Figure 16:
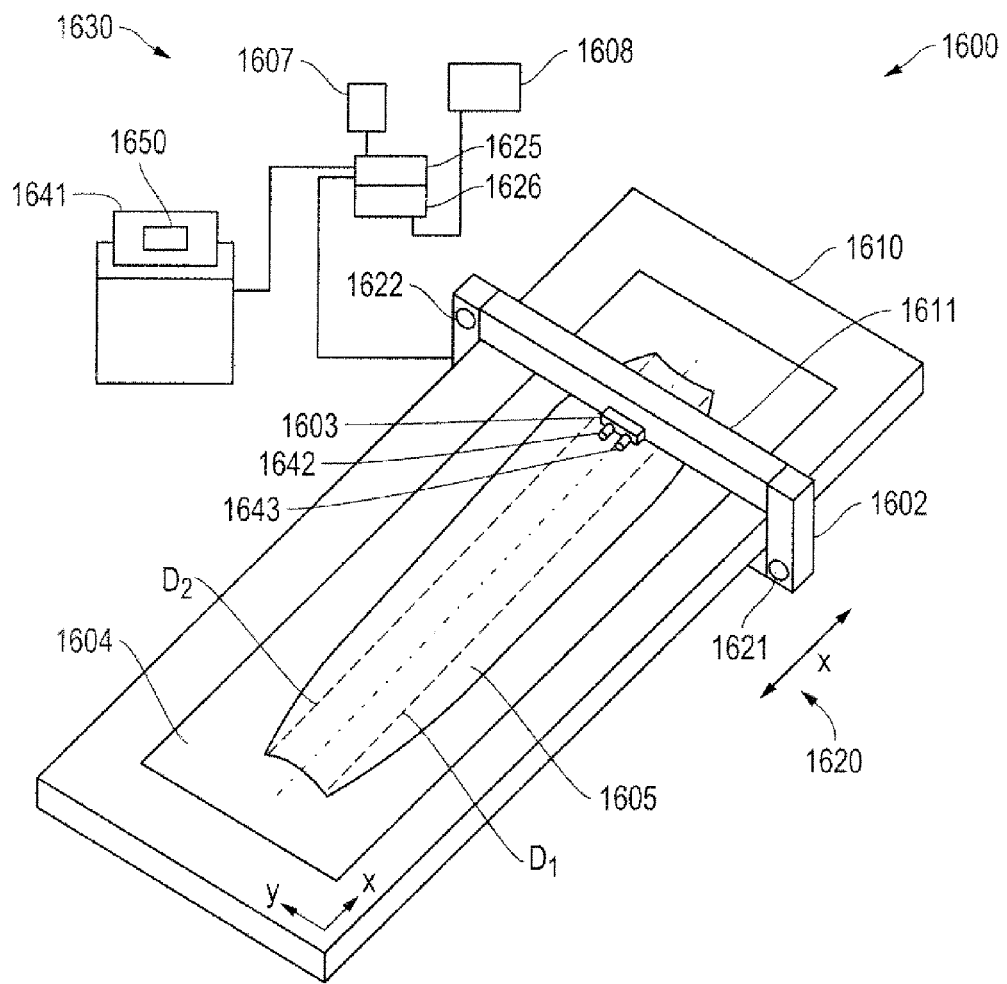
FIG. 16 shows a manufacturing system for producing gore sections.

The output parameters that are calculated may be used to cut fabric into a particular pattern to make a gore panel. For example, FIG. 16 shows an exemplary embodiment of a system for fabricating gore panels in accordance with the methods and equations presented herein related to the design of a gore panel. A table assembly 1620 comprises a table platen 1610 sized to accommodate a flat section of a suitable gore panel material 1604. Movable bridge 1602 is controllably moveable along the direction of the x-axis as denoted by the vector X. A head assembly 1603 is moveably mounted on the crossbeam 1611 of bridge 1602. Head assembly 1603 is controllably moveable along the direction of the y-axis as indicated. Movement of bridge 1602 and head assembly 1603 may be facilitated by electric motors 1621 and 1622.

Controller 1630 may comprise a processor 1625 in data communication with a memory 1626. In addition, controller 1630 may comprise input/output device 1607 that may comprise a keyboard and monitor. A set of programmed instructions 1608 may be stored in memory 1626 and may comprise instructions related to performing calculations that use the equations described previously herein for designing a gore panel or multiple layers of gore panels to form a shell section. In one embodiment, head assembly 1603 comprises a laser cutter 1642 for cutting the gore section out of material 1604. Both bridge 1602 and head assembly 1603 may be driven by controller 1630 to maneuver according to the coordinates similar to those described in FIG. 13 or the like, to produce a layer of gore panel 1605 in accordance with the embodiments described herein. In addition, head assembly 1630 may also comprise an ink jet head 1643 for marking the set of fold lines D1, D2 on gore panel 1605. Alternatively, controller 1630 may direct the movement of ink jet head 1643 to produce an outline of gore panel 1605 on material 1604 suitable for manually cutting gore panel 1605. In another alternative embodiment, controller 1630 may provide a plotted paper pattern 1641 of a gore section 1650 according to the programmed instructions 1608. Such plotted paper pattern 1641 may then be physically attached to the material 1604 for manual cutting of a gore panel.

Figure 17:
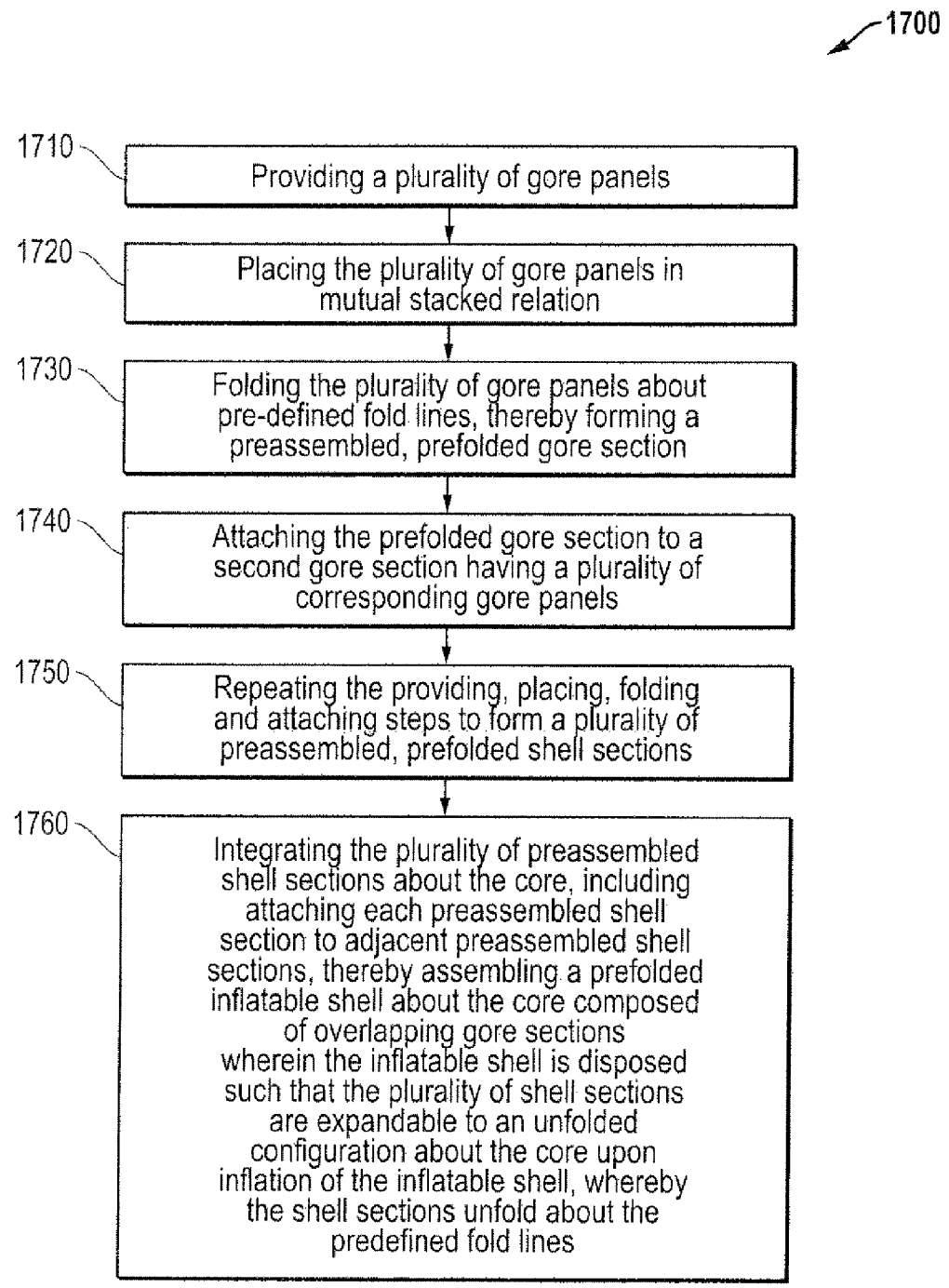
FIG. 17 is a simplified flow chart of a method of assembling an inflatable shell of an inflatable vessel in accordance with an embodiment of the present invention.

FIG. 17 provides a flow chart illustrating an overview of an exemplary method 1700 for manufacturing an inflatable shell in accordance with the exemplary embodiments described herein. The method 1700 may comprise the act of providing a plurality of gore panels, as shown at 1710. The method further comprises the act of placing the plurality of gore panels in mutual stacked relation, as indicated by method step 1720. Next, the method 1700 may comprise the act of folding the plurality of gore panels about pre-defined fold lines, forming a preassembled, prefolded gore section, as shown by method step 1730. The method 1700 may also comprise the act of attaching the pre-folded gore section to a second gore section having a plurality of corresponding gore panels, as represented by method step 1740. Method 1700 may also comprise the step of repeating the providing, placing, folding and attaching actions to form a plurality of preassembled, prefolded shell sections, as given at step 1750. The method 1700 may also comprise the step of integrating the plurality of preassembled shell sections about the core, including the act of attaching each preassembled shell section to adjacent preassembled shell sections, thereby assembling a prefolded inflatable shell about the core comprising overlapping gore sections, wherein the inflatable shell is disposed such that the plurality of shell sections are expandable to an unfolded configuration about the core when the inflatable shell is inflated, the shell sections unfolding about the predefined fold lines, as shown at step 1760.

Although only a few exemplary embodiments of this invention have been described in detail above, those skilled in the art will readily appreciate that many modifications are possible in the exemplary embodiments without materially departing from the novel teachings and advantages of this invention, Accordingly, all such modifications are intended to be included within the scope of this invention as defined in the following claims. In the claims, means-plus-function and step-plus-function clauses are intended to cover the structures or acts described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. An inflatable shell comprising a plurality of shell sections integrated together, each of the shell sections comprising:
a first gore section comprising at least one first gore panel, the at least one first gore panel having a side edge with a curvature region along a portion of the perimeter of the at least one first gore panel and a set of straight line fold lines for folding the at least one first gore panel during assembly of the inflatable shell for stowage; and
a second gore section comprising at least one second gore panel, the at least one second gore panel having a side edge with a second curvature region along a portion of the perimeter of the at least one second gore panel for attaching to the side edge of the first gore panel, the second curvature region of the at least one second gore panel and the first curvature region of the at least one first gore panel being correspondingly configured to one another so as to form a second set of fold lines for the shell section once the first and second gore panels are attached at the side edges thereto such that the at least one second gore panel remains unfolded during stowage of the inflatable shell.

2. The inflatable shell of claim 1 wherein each shell section further comprises a weight bearing strap connected to one end of the shell section for hoisting the shell section once assembled into a position about a structural core of an inflatable vessel.

3. The inflatable shell of claim 1 wherein each shell section further comprises means, connected to one end of the shell section, for bearing the weight of the shell section when hoisted into a position about a structural core of an inflatable vessel.

* * * * *